UNITED STATES PATENT OFFICE.

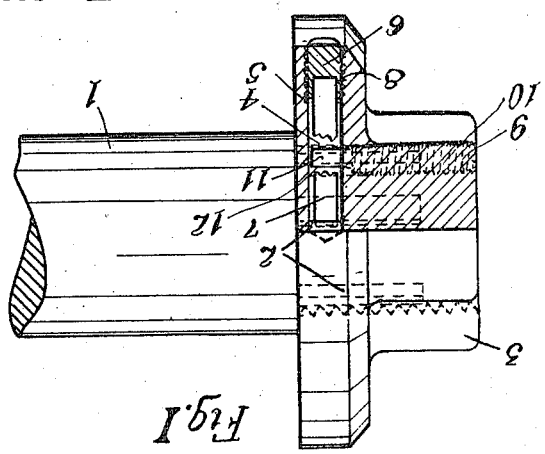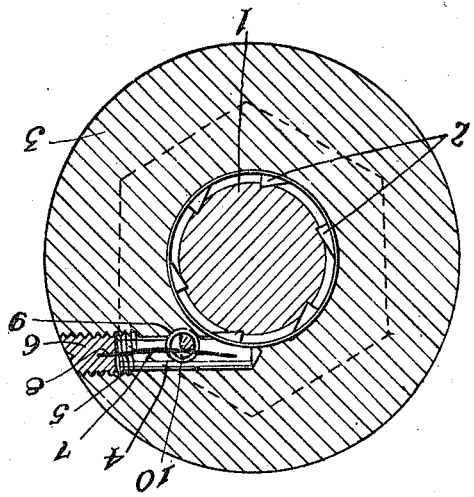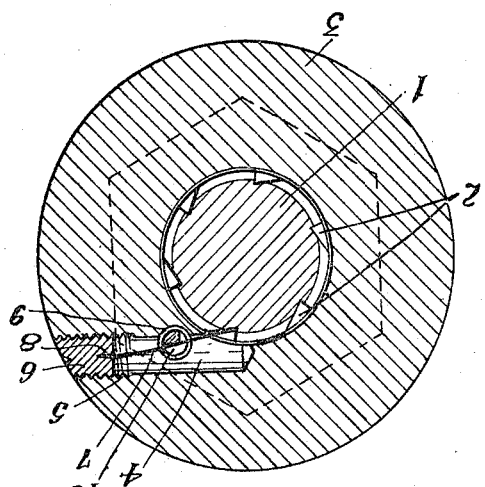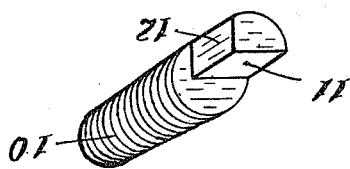

JOHN EDWARD HERMAN, OF CINCINNATI, OHIO.

NUT-LOCK.

1,255,311. Specification of Letters Patent. Patented Feb. 5, 1918.

Application filed March 7, 1917. Serial No. 153,064.

*To all whom it may concern:*

Be it known that I, JOHN EDWARD HERMAN, a citizen of the United States, residing in the city of Cincinnati, in the county of Hamilton and State of Ohio, have invented a new and useful Nut-Lock, of which the following is a specification.

This invention relates to improvements in devices for locking nuts, more especially those upon the axles of automobiles, wagons and other vehicles, but is also applicable to the ordinary bolt, and it consists of the novel construction, arrangement and combination of parts hereinafter described and claimed.

The objects of the invention are: First, to provide a neat, simple, inexpensive and practical device, which will securely lock a nut against outward rotation upon an axle or bolt, and which, when desired, will enable the nut to be removed readily; second, which shall be completely housed within the nut against rain or other foreign substances; third, in which none of its parts can be accidentally displaced, and fourth, which will leave the nut flush on all sides.

The above objects are accomplished by the construction illustrated in the accompanying drawing, in which—

Figure I is a sectional transverse view of the nut on an axle, showing the locking pawl, hereinafter described, in engagement with a notch in the axle; the interior reduced end of the unlocking bolt, hereinafter described, and, in perspective, the notches in the axle, and the body of the unlocking bolt; Fig. II is a transverse view of the nut and axle, showing the locking construction when the nut is locked; Fig. III is a similar view, but showing the construction when the nut is unlocked, and Fig. IV is an enlarged view of the unlocking bolt, showing the reduced sides of its interior end.

Similar numerals refer to similar parts throughout the several views.

Referring to the accompanying drawing by numerals, it will be seen that my invention comprises a threaded axle or bolt 1, provided with notches 2, so constructed and arranged, as shown in the drawing, that when the nut is being turned on, the pawl, hereinafter described, will pass successively into and out of them, but whenever the nut is turned in the opposite direction, said pawl impinges against the abrupt edge of the notch into which it first falls, locking the nut. Said notches are made quite deep, for reasons hereinafter mentioned. Into the side of the nut 3, and at right angles to said axle there is drilled a recess 4, which has its exterior portion 5 threaded for the reception of a plug 6, adapted thereto. Into said recess a pawl 7 is positioned, secured to said plug by being wedged into slot 8. The point of said pawl is positioned beneath the longitudinal center of said recess, whereby a more positive, deeper and, consequently, a securer impingement thereof with said notches is afforded, and thereby obviating the liability of accidental displacement of said pawl and the unlocking of the nut through the wearing away of the upper abrupt edges of said notches over which said pawl depressingly slides, when the nut is turned on. Into the face of the nut and at right angles to said recess an aperture 9 is drilled, threaded to receive bolt 10, adapted thereto. Said aperture extends to said recess. Said bolt 10 has at its interior end a major-reduced side 11, constructed and adapted to rest beneath said pawl at its longitudinal center and adjacent thereto when the nut is locked, and a minor-reduced side 12, which, when brought beneath said pawl by turning the bolt 10 sufficiently, raises said pawl out of impingement with said notches, unlocking the nut. Said reduced sides are adapted to admit of deep impingement of said pawl with said notches, increasing the security of the lock. Said pawl is made preferably of spring steel.

It will be observed by the drawing that in either the locked or unlocked position of the device, the pawl and unlocking bolt are so constructed and arranged that each automatically locks the other against loosening or displacement.

The notches used have this advantage over grooves extending the length of the threaded portion of an axle or bolt; the former are completely housed in by the nut, excluding all foreign substances from entering the mechanism of the lock and interfering therewith, which is not the case with grooves extending beyond the nut, while for locking purpose the notches are equally effective, and can be made more readily.

Both the pawl plug and the unlocking bolt are turned in place by an ordinary screwdriver, and when positioned, leave a flush surface, as will be observed by the drawing, obviating accidental external interference with the locking mechanism.

What I claim:

1. The combination of a recess, provided with a threaded end; a pawl secured to a threaded plug, disposed to enter said threaded end of said recess, whereby said pawl is positioned within said recess; a threaded aperture entering said recess at right angles thereto, and a bolt adapted thereto, said bolt having reduced sides at its end, both, said pawl and said bolt being so constructed, arranged and disposed as to lock, each the other, against displacement.

2. The combination of a recess; a pawl secured therein; a threaded aperture entering said recess at right angles thereto, and a threaded unlocking bolt adapted thereto, said bolt having reduced sides at its interior end, disposed to rest beneath said pawl, whereby said bolt is locked against displacement.

3. The combination of a threaded axle or bolt; provided with notches or grooves; a nut provided with an exteriorly-entering threaded recess; a pawl secured to a threaded plug; a threaded aperture entering at right angles to said pawl, and a threaded bolt, provided with reduced sides at its interior portion—both said pawl and said bolt being constructed, arranged and disposed, each to lock the other against displacement, and whereby said nut is locked and unlocked.

JOHN EDWARD HERMAN.

Copies of this patent may be obtained for five cents each, by addressing the "Commissioner of Patents, Washington, D. C."